E. RECTOR.
TIRE INFLATER.
APPLICATION FILED AUG. 3, 1910.

1,012,098.

Patented Dec. 19, 1911.

2 SHEETS—SHEET 1.

Witnesses:

Inventor
Enoch Rector
By his Attorney

E. RECTOR.
TIRE INFLATER.
APPLICATION FILED AUG. 3, 1910.
1,012,098.
Patented Dec. 19, 1911.
2 SHEETS—SHEET 2.
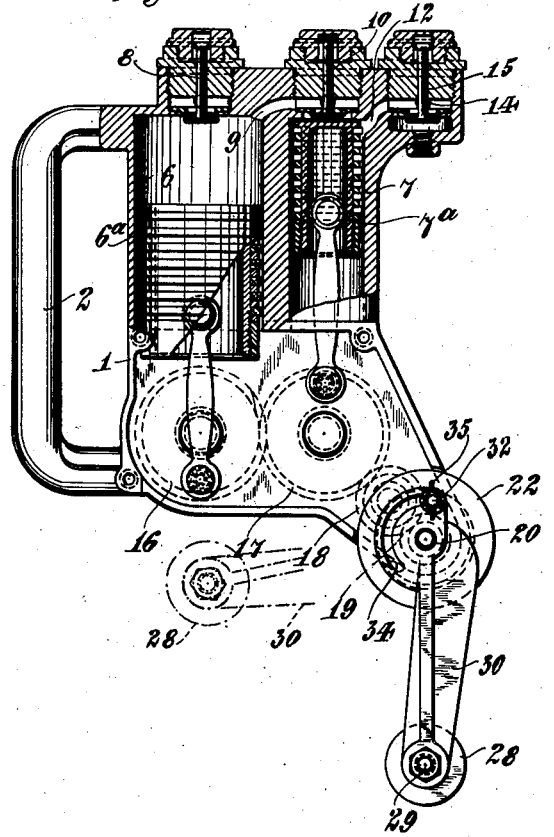
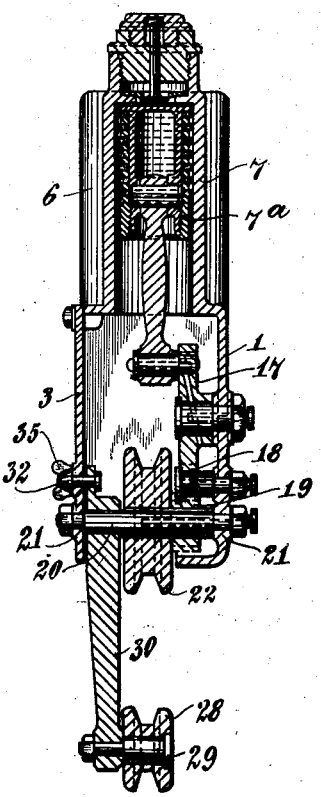
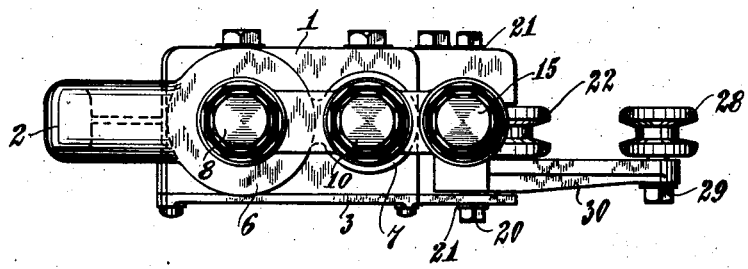
Witnesses:
Geo. Schwarz
Sully Russo
Inventor
Enoch Rector
By his Attorney
Reading Ansley Austin

UNITED STATES PATENT OFFICE.

ENOCH RECTOR, OF NEW YORK, N. Y.

TIRE-INFLATER.

1,012,098.

Specification of Letters Patent.  Patented Dec. 19, 1911.

Application filed August 3, 1910. Serial No. 575,350.

*To all whom it may concern:*

Be it known that I, ENOCH RECTOR, a citizen of the United States, residing in the borough of Manhattan of the city of New York and State of New York, have invented certain new and useful Improvements in Tire-Inflaters, of which the following is a specification.

The invention relates especially to a portable apparatus taking power from a driven member and is shown applied to an apparatus for inflating the tires of automobiles, and consists in providing a portable apparatus having the capacity for compressing large quantities of air in a short period of time.

The primary object of the invention is to provide a compact portable apparatus of considerable capacity, which may be operated by power applied from the engine or other motive power of the vehicle.

A further object of the invention is to provide a device which can be held in engagement with the driving means manually and without the use of straps, bolts or other mechanism to maintain contact between the driven parts of the device and the driving means.

The various other objects of the invention will be more fully set forth in the following description of one form of mechanism embodying the invention, which further consists in the new and novel features of construction and combinations of parts hereinafter set forth and claimed.

Figure 1:
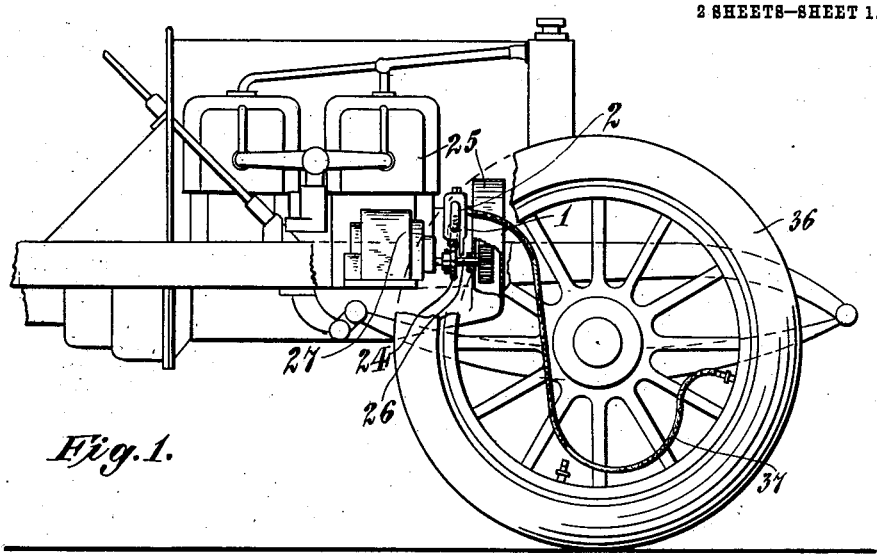
Figures 2, 3:
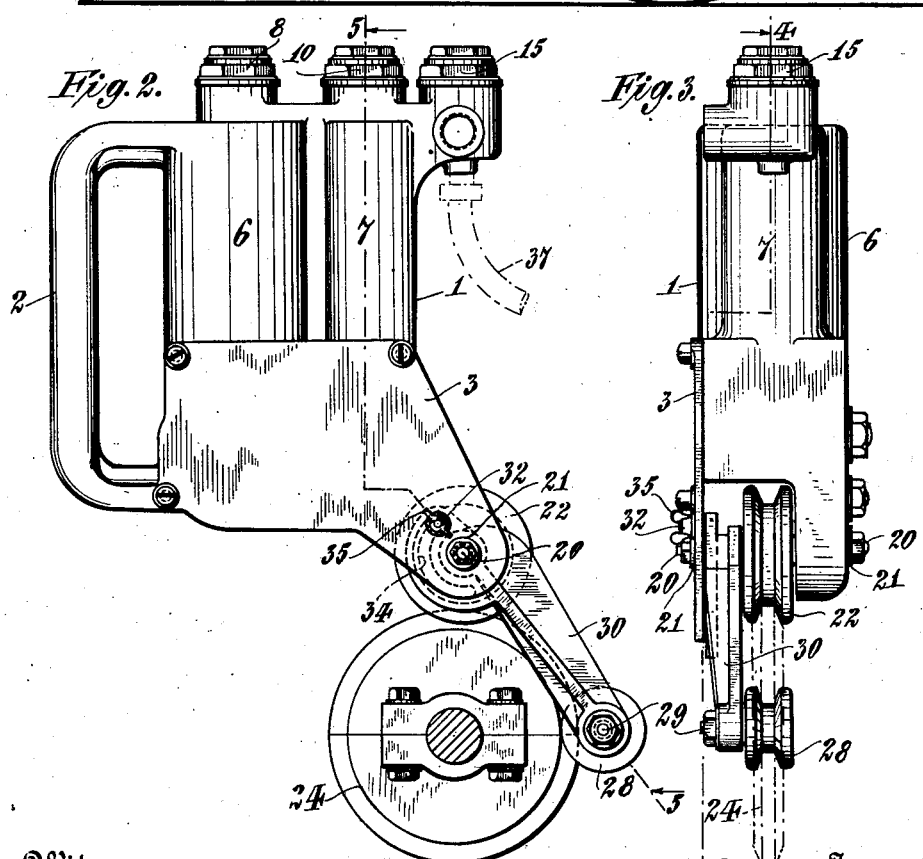

In the accompanying drawings: Figure 1 is a side elevation, partly diagrammatical, of a self-propelled vehicle provided with my improved tire inflater. Fig. 2 represents a side elevation of the tire inflater. Fig. 3 represents an end view of the same. Fig. 4 represents a side elevation partly in section on the lines 4—4 of Fig. 3. Fig. 5 represents a vertical section on the lines 5—5 of Fig. 2. Fig. 6 represents a plan view of the device.

Referring to the drawings, the tire inflater co' prises a portable casing 1, having a suitable handle 2 formed integral therewith, the said casing being provided with a door or detachable plate 3 to afford access to the working parts. Cylinders 6 and 7 are formed integral with the casing, having the plungers 6ª and 7ª operative therein. Air is admitted to the cylinder 6 from the outside, through a valve 8 and the said cylinder communicates with the cylinder 7 through a passage 9 controlled by a valve 10. The cylinder 7 communicates with an outlet 12 through the passage 14 controlled by a valve 15. The plungers are actuated through a train of gears 16—17 and 18 mounted on the casing, which are driven from a pinion 19 mounted upon a shaft 20 journaled in lugs or projections 21 formed integral with the casing. A driven member such as the grooved pulley 22 is keyed upon the shaft 20 which is adapted to engage with and be driven by any suitable driving means as the driving disk 24 which is actuated by the engine 25 of the vehicle. Said driving disk may be mounted upon any rotating part of the self-propelled vehicle desired, and in the accompanying drawings I have shown the same mounted upon the driving shaft 26 of the magneto 27.

In order to insure contact between the driven pulley 22 and the driving disk 24 I provide a balanced member such as the pilot pulley 28 which is rotatable upon a stub shaft 29 mounted in the end of a floating arm 30 which is pivoted on the shaft. A bolt 32 is secured to the arm, and moves in a slot 34 provided in the projection of the casing, so that the arm may be secured in any desired position by means of the wing nut 35. Preferably the said slot is so constructed that the arm may be turned on the shaft until the pilot pulley rests against the bottom of the casing, so that it will be protected from injury when not in use.

In operation the cylinders 6 and 7 constitute a two-stage air compressor, from which the compressed air may be delivered to the tire 36 of a self-propelled vehicle by any suitable means as the flexible tube 37. The pilot pulley 28 is first adjusted with relation to the driven pulley 22 and then by means of the handle 2 preferably the pilot pulley is first brought into contact with the rotating driving disk 24 and then the driven pulley is brought into engagement with said driving disk. The apparatus may be held manually in operative engagement with the disk until the desired supply of compressed air has been obtained as the balanced member serves to partially balance the forces tending to displace the driven member from the driving member and thus enables the operator to hold the driven member in engagement with the driving member when the driven member is under considerable load.

Preferably the length of the floating arm is greater than the radius of the driving disk, so that a considerable arc will intervene between the pulleys and the chord between the points of contact will be greater than the length of said floating arm. By means of this construction the tire inflater can be immediately connected with and detached from the driving mechanism, and may be held manually in operative engagement with said driving mechanism and without the use of straps, bolts or other holding means.

Heretofore it has been necessary with apparatus employed for compressing air to a considerable degree of pressure, to employ means for holding the apparatus in engagement with the driving means, especially since such driving means rotates at a relatively high rate of speed. With my improved construction no such holding devices are necessary, and the device can be engaged with or disengaged from the driving disk at any time desired without stopping the engine.

Although the particular mechanism selected for illustrating my invention is utilized for inflating tires, it is obvious that the same device can be used for supplying air under pressure to any parts other than the tires, and that it may be actuated by any suitable motive power other than the engine of a self-propelled vehicle if desired. It is obvious also that various modifications can be made in the construction of the several parts of the apparatus shown and described herein, such, for example, as substituting a driving gear and a driven gear respectively for the driving disk and the driven pulley shown in the accompanying drawings and that various other changes, within the skill of the mechanic may be made in the construction and arrangement of the parts without departing from the spirit of the invention, provided the means set forth in the following claims be employed.

I claim as my invention:

1. In an apparatus comprising a frame or casing and driven mechanism carried by said casing taking power from a driving member, the combination with a driven member connected with said mechanism and engaging with the driving member, of means adjustably supported with respect to the driven member and engaging with the driving member at a point sufficiently removed from the point of engagement between the driving member and the driven member to partially balance the forces tending to displace said driven member and to permit said driven member to be held manually in engagement with the driving member.

2. A tire inflater taking power from a driving wheel and comprising a casing, a cylinder formed integral with said casing, a piston movable in said cylinder, a rotatable shaft mounted in said casing, a driven pulley on said shaft operatively connected with said piston, an arm pivoted on said shaft, and a grooved pulley on said arm, said pulleys contacting directly with the driving wheel at points on the circumference thereof separated by a distance approximately equal to the length of the arm.

3. A tire inflater taking power from a driving wheel and comprising a casing, a handle formed integral with said casing, a plurality of cylinders formed integral with said casing, a plunger movable in each of said cylinders, a rotatable shaft in said casing, a pulley provided with a groove in its surface mounted on said shaft and operatively connected with each of said plungers, an arm pivoted to said shaft, a stub shaft on said arm, a grooved pulley on said stub shaft in alinement with the driven pulley, and means for holding the arm in its adjusted position with relation to the casing, both of said pulleys being adapted to engage simultaneously with the driving wheel.

4. An apparatus taking power from a driving wheel, comprising a casing having a handle whereby said inflater may be held manually in position, operative mechanism in said casing, two members supported by the casing adapted to engage the driving wheel at separated points on the circumference thereof, one of said members being operatively connected to the said operative mechanism and the other being adapted to partially balance the forces tending to displace said driven member.

5. An apparatus taking power from a driving wheel comprising a casing, driven mechanism in said casing means secured to said casing whereby said inflater may be supported manually, a pair of separated members including a driven member engaging said driving wheel at separated points on the circumference thereof, one of said members being operatively connected with the driven mechanism and the other member being movable with respect to said first member and adapted to engage the driving wheel and partially balance the thrust on said first member when the same is in its operative position.

6. A tire inflater for taking power from a driving wheel comprising a casing, a pair of separated members including a driven wheel engaging said driving wheel at separated points on the circumference thereof and steadying said casing in position, compressing mechanism carried by said casing, and means for driving said compressing mechanism from said driven wheel, both of said members engaging with the periphery of the driving wheel and one of said members having an extension engaging the side of said driving wheel to steady said inflater.

7. An apparatus taking power from a driving member and partially supported thereby comprising a casing, driven mechanism carried by said casing, a driven member operatively connected with said mechanism adapted to rest upon and engage with the driving member, and means secured to the casing and adapted to rest upon and engage with the driving member in such position with relation to the driven member as to partially balance the forces tending to displace said driven member.

8. A tire inflater for taking power from a driving wheel comprising a casing, an adjustable arm carried thereby, said arm having a lateral extension engaging the side of said driving wheel, a driven wheel adapted to engage the driving wheel, and compressing mechanism actuated by said driven wheel.

9. A tire inflater for taking power from a driving wheel, comprising a casing, an adjustable arm pivotally mounted on said casing and having means remote from the pivot point of said arm for engaging said driving wheel, a driven wheel rotatably mounted on the pivot point of said arm and engaging the driving wheel, compressing mechanism, and means for driving the same from said driving wheel.

10. A tire inflater taking power from a driving wheel, comprising a casing, compressing mechanism supported by said casing, a driven member operatively connected with the compressing mechanism and adapted to engage the driving wheel and a separate member movably supported on the casing and adapted to engage the driving wheel at a point remote from the point of contact of the driven member and partially balance the thrust on the driven member, whereby said driven member may be held manually in engagement with the driving wheel.

11. A tire inflater taking power from a driving wheel, comprising a casing, compressing mechanism carried by said casing, a handle secured to said casing for manually holding the same in its operative position, a driven wheel mounted on the casing and adapted to engage the driving wheel, a pivoted arm secured to the casing and a holding member mounted on said arm and engaging with the driving member at a point sufficiently remote from the point of engagement of the driven member to partially balance the thrust on the driven member so that said driven member may be held manually in engagement with the driving member.

This specification witnessed this 30th day of July, A. D., 1910.

ENOCH RECTOR.

Signed in the presence of—
AMBROSE L. O'SHEA,
N. A. SMITH.